United States Patent [19]

Kaminsky et al.

[11] Patent Number: 5,950,121
[45] Date of Patent: Sep. 7, 1999

[54] METHOD AND APPARATUS FOR FRAUD CONTROL IN CELLULAR TELEPHONE SYSTEMS

[75] Inventors: William J. Kaminsky; Jeffrey G. Sanpore, both of Walnut Creek; David L. Daniels, Piscentia; Mary H. Kennedy, Pleasant Hill, all of Calif.

[73] Assignee: AirTouch Communications, Inc., San Francisco, Calif.

[21] Appl. No.: 08/633,406

[22] Filed: Jun. 10, 1996

Related U.S. Application Data

[60] Continuation-in-part of application No. 08/389,348, Feb. 16, 1995, Pat. No. 5,555,551, which is a division of application No. 08/084,367, Jun. 29, 1993, Pat. No. 5,420,910.

[51] Int. Cl.⁶ ...................................................... H04Q 7/00
[52] U.S. Cl. .......................... 455/410; 455/411; 455/67.1
[58] Field of Search ....................... 380/21, 23; 455/67.1, 455/227, 228, 405, 410, 411, 517; 340/825.31, 825.34, 825.5

[56] References Cited

U.S. PATENT DOCUMENTS

| | | |
|---|---|---|
| 4,114,136 | 9/1978 | D'Albora . |
| 4,146,892 | 3/1979 | Overman et al. . |
| 4,162,377 | 7/1979 | Mearns . |
| 4,191,860 | 3/1980 | Weber . |
| 4,277,649 | 7/1981 | Sheinbein . |
| 4,284,851 | 8/1981 | Schweitzer et al. . |
| 4,393,278 | 7/1983 | Miyoshi . |
| 4,411,017 | 10/1983 | Talbot . |
| 4,429,257 | 1/1984 | Campbell . |
| 4,439,636 | 3/1984 | Newkirk et al. . |
| 4,475,009 | 10/1984 | Rais et al. . |
| 4,549,308 | 10/1985 | LoPinto . |
| 4,593,155 | 6/1986 | Hawkins . |
| 4,597,107 | 6/1986 | Ready et al. . |
| 4,626,845 | 12/1986 | Ley . |
| 4,646,345 | 2/1987 | Zdunek et al. . |
| 4,680,785 | 7/1987 | Akiyama et al. . |
| 4,698,839 | 10/1987 | DeVaney et al. . |
| 4,700,374 | 10/1987 | Bini . |
| 4,726,056 | 2/1988 | An et al. . |
| 4,756,020 | 7/1988 | Fodale . |
| 4,788,718 | 11/1988 | McNabb et al. . |

(List continued on next page.)

FOREIGN PATENT DOCUMENTS

| | | |
|---|---|---|
| 1236532 | 5/1988 | Canada . |
| 2114040 | 9/1994 | Canada . |
| 0163358 | 12/1985 | European Pat. Off. . |
| 0629093 | 12/1994 | European Pat. Off. . |
| 3402467 | 8/1985 | Germany . |
| WO 91/18467 | 11/1991 | WIPO . |
| WO 91/18468 | 11/1991 | WIPO . |
| WO 93/09640 | 5/1993 | WIPO . |
| WO 93/11646 | 6/1993 | WIPO . |
| WO 93/12606 | 6/1993 | WIPO . |

OTHER PUBLICATIONS

Mobile Phone News, article, Defense Technologies Cellular Fraud Management, vol. 12, No. 11, Mar. 14, 1994.

Mobile Phone News, article, "TRW's Phoneprint added to Cellular's Anti–Fraud Arsenal", vol. 11, No. 41, Oct. 25, 1993.

Telephone Engineer & Management, article, "Cellular Carriers Lose Estimated $300–300 Mil to Fraud", pp. 62, Dec. 1, 1993.

Security Technology News, article, "Cellular Toll Fraud on the Decline", vol. 2, No. 4, Feb. 22, 1994.

*Primary Examiner*—Edward F. Urban
*Assistant Examiner*—Thuan T. Nguyen
*Attorney, Agent, or Firm*—Gates & Cooper

[57] ABSTRACT

A method and apparatus for fraud control in cellular telephone systems. The invention identifies relative fraud probabilities for call records from the cellular telephone system, associates the call records with radio frequency (RF) signatures, and identifies the radio frequency signatures as being fraudulent or valid based on the relative fraud probabilities for the associated call records.

22 Claims, 8 Drawing Sheets

U.S. PATENT DOCUMENTS

| | | |
|---|---|---|
| 4,791,640 | 12/1988 | Sand . |
| 4,797,931 | 1/1989 | Furukawa et al. . |
| 4,797,948 | 1/1989 | Milliorn et al. . |
| 4,843,562 | 6/1989 | Kenyo et al. . |
| 4,860,352 | 8/1989 | Laurance et al. . |
| 4,893,330 | 1/1990 | Franco . |
| 4,955,049 | 9/1990 | Ghisler . |
| 4,972,479 | 11/1990 | Tobias, Jr. et al. . |
| 5,003,629 | 3/1991 | Ness-Cohn et al. . |
| 5,005,210 | 4/1991 | Ferrell . |
| 5,031,204 | 7/1991 | McKernan . |
| 5,063,588 | 11/1991 | Patsiokas et al. . |
| 5,067,147 | 11/1991 | Lee . |
| 5,091,942 | 2/1992 | Dent . |
| 5,095,500 | 3/1992 | Tayloe et al. . |
| 5,128,959 | 7/1992 | Bruckert . |
| 5,148,472 | 9/1992 | Freese et al. . |
| 5,153,919 | 10/1992 | Reeds, III et al. . |
| 5,237,612 | 8/1993 | Raith ......................................... 380/23 |
| 5,239,294 | 8/1993 | Flanders et al. . |
| 5,241,598 | 8/1993 | Raith . |
| 5,249,230 | 9/1993 | Mihm, Jr. . |
| 5,299,263 | 3/1994 | Beller et al. . |
| 5,301,223 | 4/1994 | Amadon et al. . |
| 5,309,501 | 5/1994 | Kozik et al. . |
| 5,329,578 | 7/1994 | Brennan et al. . |
| 5,335,265 | 8/1994 | Cooper et al. . |
| 5,335,278 | 8/1994 | Matchett et al. ........................ 455/410 |
| 5,337,345 | 8/1994 | Cassidy et al. ......................... 455/410 |
| 5,345,595 | 9/1994 | Johnson et al. ......................... 455/405 |
| 5,375,244 | 12/1994 | McNair . |
| 5,420,908 | 5/1995 | Hodges et al. . |
| 5,448,760 | 9/1995 | Frederick ............................... 455/67.1 |
| 5,463,681 | 10/1995 | Vaios et al. . |

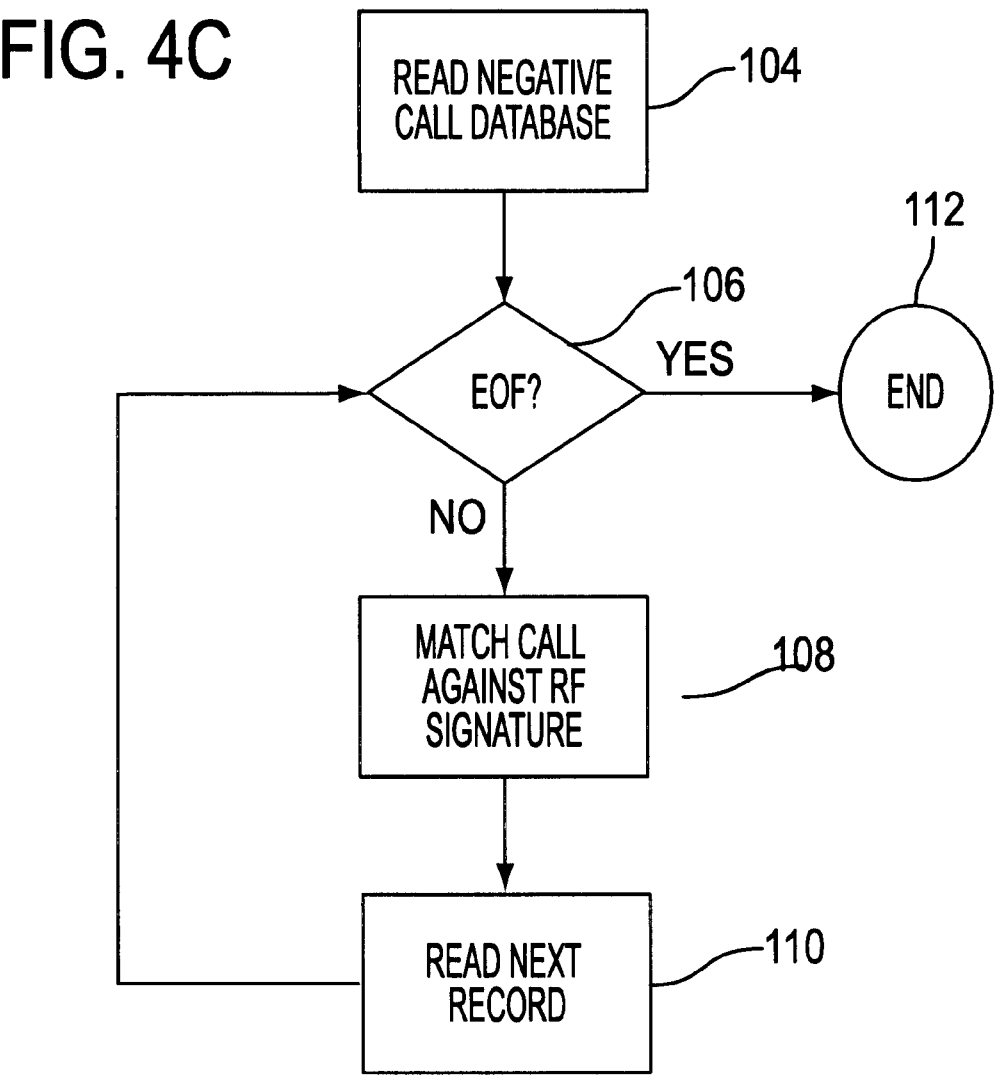

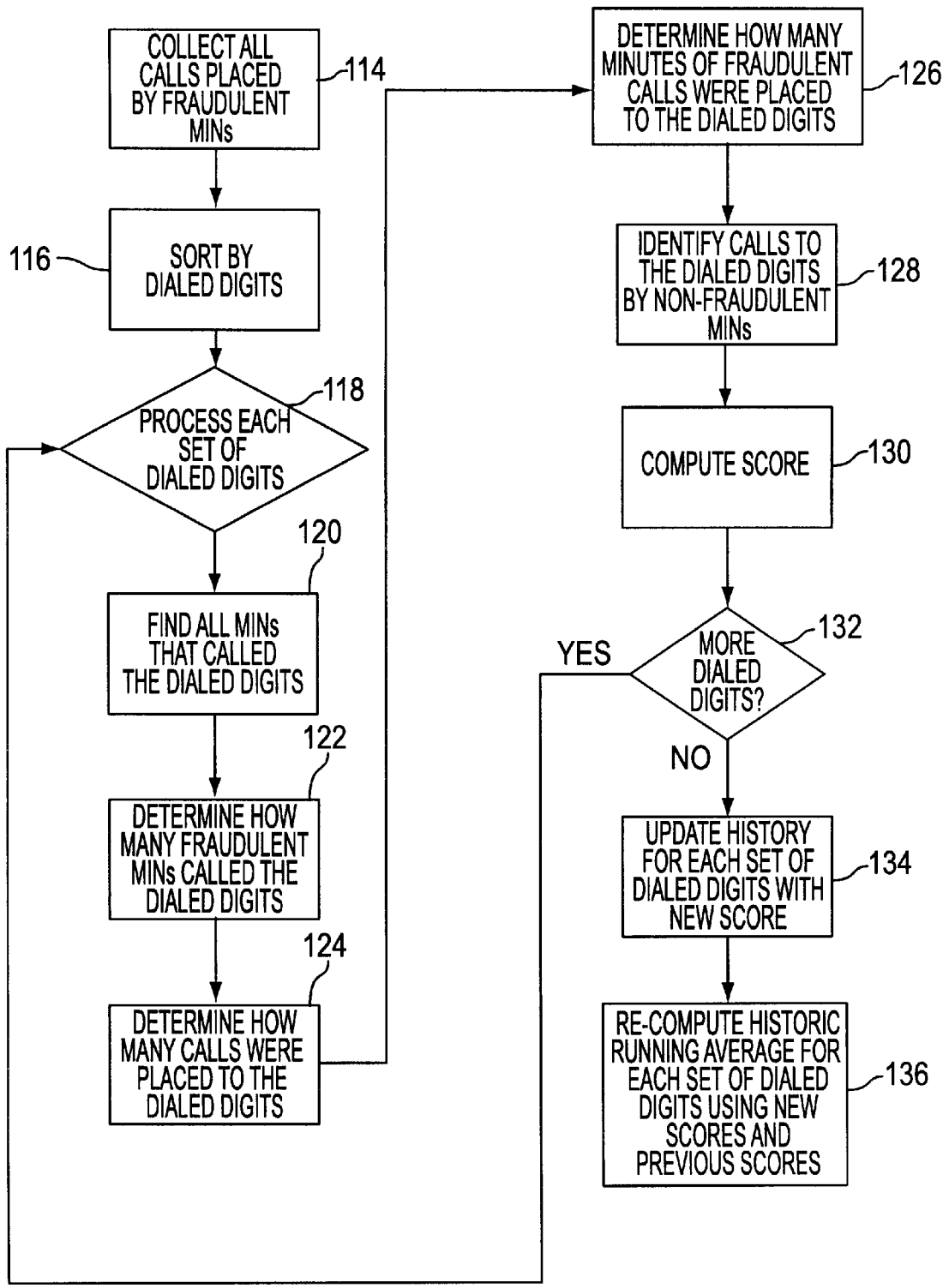

METHOD AND APPARATUS FOR FRAUD CONTROL IN CELLULAR TELEPHONE SYSTEMS

CROSS-REFERENCE TO RELATED APPLICATIONS

This patent application is a continuation-in-part of U.S. patent application Ser. No. 08/389,348, filed Feb. 16, 1995, now U.S. Pat. No. 5,555,551, issued Sep. 10, 1996 by Ronald S. Rudokas, et al., which is a divisional of U.S. patent application Ser. No. 08/084,367, filed Jun. 29, 1993, by Ronald S. Rudokas, et al., now U.S. Pat. No. 5,420,910, issued May 30, 1995, both of which are entitled "METHOD AND APPARATUS FOR FRAUD CONTROL IN CELLULAR TELEPHONE SYSTEMS UTILIZING RF SIGNATURE COMPARISON", and both of which are incorporated by reference herein.

BACKGROUND OF THE INVENTION

1. Field of the Invention

This invention relates in general to radio frequency (RF) communication systems, and in particular, to a method and apparatus for fraud control in cellular mobile radiotelephone (CMR) and personal communications services (PCS) systems.

2. Description of Related Art

Cellular telephones combine the mobility of the radio link and the world-wide land telephone network to provide a communication link to any other telephone in the world. However, as cellular phones have become more prevalent throughout the country, fraud has become a major problem. Cellular fraud robs service providers of hundreds of millions of dollars every year. Like all crimes, there are several varieties of cellular fraud, including "cloning."

Cloning fraud, which occurs when a legitimate subscriber's MIN/ESN combination is used for illegal purposes, is among the most sophisticated and difficult forms of fraud to prevent. Often, the pirate will use simple electronic devices to "capture" the legitimate MIN/ESN combination during its transmission by radio frequency (RF). In these cases, the legitimate subscriber often does not know fraud is being committed with his or her MIN/ESN combination until they receive the bill. This is currently the most popular method of gaining illegal access to a cellular system, because the legitimacy of the stolen MIN/ESN combinations makes cloning difficult to catch.

There are certain steps that can be taken to prevent cloning fraud. In some instances, carriers block calls to certain destinations, or impose "brownouts" on calls using specified MIN codes, particularly on international calls, that have been previously abused. Although drastic, this method currently is often the only way to stop cloning fraud.

The eventual release of digital cellular phones into the mass market will provide another avenue for fraud. Digital phones will also be susceptible to new and improved criminal techniques for stealing MIN/ESN combinations. Thus, carriers are forced to seek other methods of detecting and preventing fraudulent calls.

Several companies, including Electronic Data Systems (EDS) and Subscriber Computing, Inc. (SCI) have developed anti-cloning products that analyze calling patterns using call records. For example, EDS' PCC Cloning Detection System and SCI's Fraud Watch System are designed to be interfaced with cellular switches, so that call information can be collected after the calls have been completed. These systems can be used to identify calling patterns in the collected information that indicate fraudulent usage.

These systems typically allow operators to specify certain criteria to identify fraud. These criteria may include number of calls per hour, call durations, number of minutes used by a specific phone within an hour, number of international or toll calls per hour, and calls to specific countries or NPA/NXXX codes. Operators can also identify fraudulent usage by the specific number dialed for those numbers that have been previously identified as a number called by fraudulent callers. The call records of cellular phones meeting any number of criteria can be viewed online or printed.

Although they cannot prevent cloning fraud, such systems provide carriers with a method of identifying cloning fraud, so that losses can be tabulated. Unfortunately, current methods can only detect or monitor fraud after the caller hangs up, and provide no way to stop fraud. Thus, there is a need in the art for techniques that enhance the use of analyzed call patterns to deny pirates the use of cellular telephone systems.

SUMMARY OF THE INVENTION

To overcome the limitations in the prior art described above, and to overcome other limitations that will become apparent upon reading and understanding the present specification, the present invention discloses a method and apparatus for fraud control in RF communications systems, and cellular telephone systems in particular. The invention identifies relative fraud probabilities for call records from the cellular telephone system, associates the call records with radio frequency (RF) signatures, and identifies the radio frequency signatures as being fraudulent or valid based on the relative fraud probabilities for the associated call records.

BRIEF DESCRIPTION OF THE DRAWINGS

Referring now to the drawings in which like reference numbers represent corresponding elements throughout:

FIGS. 4A, 4B, and 4C are flowcharts illustrating the steps involved in call tagging according to the present invention;

FIG. 5 is a flowchart illustrating the steps involved in identifying fraud dialed digits (FDD), which are numbers that are called by fraudulent phones.

DETAILED DESCRIPTION OF THE PREFERRED EMBODIMENT

In the following description of the preferred embodiment, reference is made to the accompanying drawings which form a part hereof, and in which is shown by way of illustration, a specific embodiment in which the invention may be practiced. It is to be understood that other embodiments may be used and changes may be made without departing from the scope of the present invention.

Overview

The present invention provides a method and apparatus for fraudulent control in controlled access wireless communications systems, including cellular mobile radiotelephone (CMR) systems, personal communications services (PCS) systems, and specialized mobile radio (SMR) systems. The present invention identifies fraudulent cellular phones by past behavior and a unique identifier, and then denies these cellular phones any further use of the cellular network. The present invention also has application to system monitoring of cell site and subscriber phone performance, cellular phone location services, and other applications.

Figure 1:
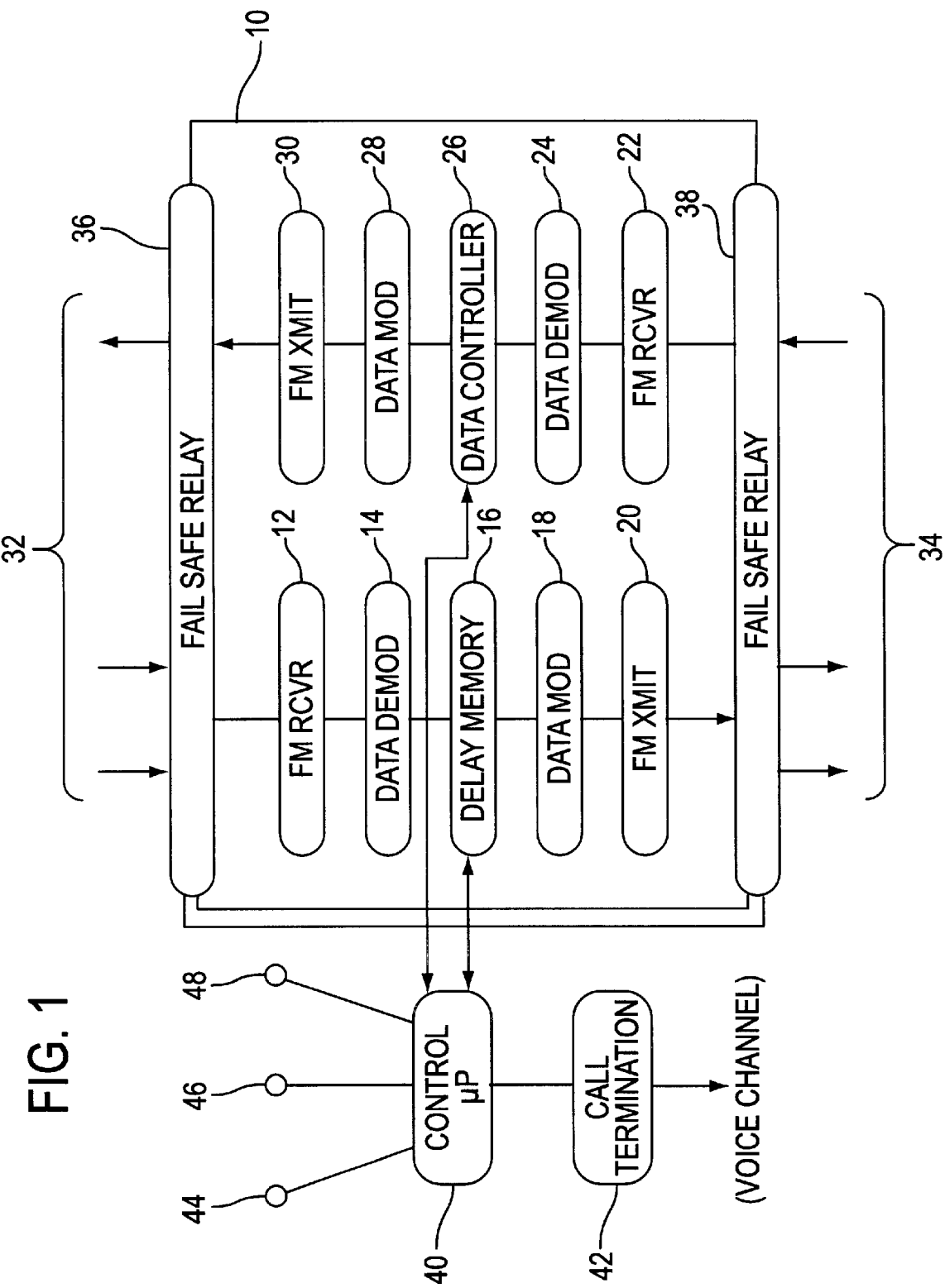
FIG. 1 is a block diagram illustrating the components of the present invention.

FIG. 1 is a block diagram illustrating a component of the present invention. A control channel editor 10 comprises receive side components including an FM receiver 12, data demodulator 14, delay memory logic 16, data modulator 18 and an FM transmitter 20, and transmit side components including an FM receiver 22, data demodulator 24, data controller 26, data modulator 28 and an FM transmitter 30.

The control channel editor 10 is coupled to the RF distribution cabling from the cell site antennae 32 and to the cell site control channel equipment 34. Since the control channel editor 10 deals with a standard RF interface, it can be used with any cell site equipment 34. Moreover, the operation of the control channel editor 10 is transparent to cellular phone users during normal operation, and acts only to interrupt the placement of calls by fraudulent cellular phones.

In order to provide the level of reliability required in a public service system, fail-safe relays 36 and 38 are provided to allow normal operation of the cell site equipment should a malfunction occur within the control channel editor 10. If the control channel editor 10 fails in any way, the relays 36 and 38 will be de-energized, so that control channel editor 10 is bypassed.

A control processor 40 is coupled to the control channel editor 10 via the delay memory logic 12 and the data controller 26. Also coupled to the control processor is a call termination signal generator 42, an RF signature system 44, a switch 46, and a centralized fraud control system 48.

Upon further reading of this specification, those skilled in the art will recognize that not all of the various components shown in FIG. 1 are required to practice the present invention. Moreover, different combinations of the components from those illustrated herein may be used, as described in more detail below. In addition, the connections between components may be modified from those illustrated herein, depending on the method of fraud control used.

Operation

When a user first turns on his cellular telephone, the cellular phone scans and identifies the set-up or control channels being received. The cellular phone then selects and tunes to the strongest control channel signal, presumably from the nearest cell transmitter. Transmitted "busy-idle" bits inform the cellular phone of the status of the reverse signaling portion (phone to cell site) of the control channel to prevent simultaneous seizure by more than one cellular phone. There are other handshake and timing checks to guard against collisions between cellular phones.

The cellular phone automatically registers with the cellular system when it is powered on. At registration, the phone sends its mobile identification number (MIN), electronic serial number (ESN), station class mark, etc., to the cell site. Depending upon system procedures, registration can verify that service for the cellular phone is available, or that the cellular phone is not on a "hot list" relating to unauthorized use or stolen phones. However, unless the MIN/ESN combination is on the "hot list," registration will not identify cloning fraud. After registration, the cellular phone then turns off its transmitter, although it continues to monitor the selected control channel for incoming calls.

When a call is originated from the cellular phone, the subscriber enters the dialed digits of the called number, which are temporarily stored in the cellular phone, and presses the "send" key. The cellular phone then goes "off-hook," and scans and selects the strongest control channel. When a "busy-idle" bit signifies that the control channel is idle, the phone sends a data stream to the cell site, including its identification (MIN/ESN) and the dialed digits of the called number.

In one embodiment of the present invention, the signaling data stream from the cellular phone is received as RF signals at the antennae 32 of the cell site. The RF signals are coupled from the antennae 32 to the FM receiver 12, and then demodulated by data demodulator 14. At the appropriate time, the transmit side components of the control channel editor 10 toggle the busy/idle bit in the signaling data stream to the cellular phone. This "handshake" lets the cellular phone know that the cell site is receiving the control signal. The data stream is then stored at delay memory logic 16, so that the call origination request represented thereby can be delayed if necessary until the identity of the cellular phone is verified. The data stream is also transmitted to the control microprocessor 40, which uses one or more of a plurality of identification techniques to determine whether the cellular phone is fraudulent, and then "tags" the call using a control record to indicate whether the cellular phone is fraudulent or not. After the control microprocessor 40 completes its identification, and has determined that the cellular phone is not fraudulent, the data stream is re-modulated by data modulator 18 to the same frequency and then transmitted to a control channel transceiver component (not shown) of the cell site equipment 34 by the FM transmitter 20. To complete the call set-up, the control channel transceiver component of the cell site equipment 34 transmits the voice channel assignment to the transmit side components of the control channel editor 10. The transmit side components of the control channel editor 10 transmit the voice channel assignment to the cellular phone and to the control processor 40.

If the cellular phone is identified as fraudulent, then the control processor 40 and/or the control channel editor 10 and/or the specially programmed switch 46 can use one or more of a plurality of different methods to handle the call origination. For example, one method may completely interrupt or deny the call set-up, so that the data stream received from the cellular phone is not transmitted to the control channel transceiver of the cell site equipment 34. Another method may alter the dialed phone number embedded in the data stream, so that the call is re-routed to a customer service phone number or "fraud hot line" phone number instead of the phone number dialed by the user. Both of these methods would preferably use a fast identification technique in the control microprocessor 40, e.g., identification within 0.5 seconds, so that calls are not adversely affected by slow call origination response. Moreover, this method would require only the receive side components of the control channel editor 10.

Still another method may send release, reorder, maintenance, or interrupt order commands to the cellular phone using the transmit side components of the control channel editor 10. While this method could be used with a fast identification technique, it is also readily used with slower identification techniques, e.g., identification within one second. Moreover, this method would require both the receive side and transmit side components of the control channel editor 10, although the receive side components may only need to "tap" into the reverse signaling data streams and may not have to delay and/or re-build the data streams.

Yet another method may transmit a call termination signal to a voice channel transceiver (not shown) of the cell site equipment 34 using the call termination signal generator 42. The particular voice channel transceiver is identified by the voice channel assignment information provided to the control processor 40 by the transmit side components of the control channel editor 10. The call termination signal generator 42 instructs the cell site equipment 34 that the user has "hung up" his phone, so that the cell site equipment 34 then also hangs up. While this method could be used with a fast identification technique, it also permits the use of slower, more complex identification techniques, e.g., identification taking more than one second. Moreover, the call termination could occur at any point during the call, so there is no time limit for-the identification techniques. However, the method generates call records that will need to be resolved during the billing cycle to avoid billing the valid customers for the fraudulent calls.

Still yet another method may transmit a call termination command to the switch 46 from the control microprocessor 40. This command would instruct the switch 46 to terminate the call. While this method could be used with a fast identification technique, it also permits the use of slower, more complex identification techniques, e.g., identification taking more than one second. The call termination could occur at any point during the call, so there is no time limit for the identification techniques. Moreover, this method may only require the receive side components of the control channel editor 10 for "tapping" the signaling data stream from the cellular phone, and thus may not have to delay and/or re-build the data streams. However, the method generates call records that will need to be resolved during the billing cycle to avoid billing the valid customers for the fraudulent calls.

The identification techniques performed by the control microprocessor 40 compare the cellular phone placing the call against one or more databases of identification data, and then "tags" the call by generating the control record to indicate whether the cellular phone is fraudulent or not. These comparisons may be performed against a negative validation database (containing known fraudulent cellular phones) or a positive validation database (containing all known valid cellular phones). Typically, a negative validation database would be preferred, because it would be smaller and more readily searched, thereby limiting the amount of time the comparison would require. Moreover, with the negative validation database, secondary pattern data, such as call history, called number, call frequency, call time, station, class, etc., can be used to validate a close match.

The identification and prevention techniques performed by the present invention can comprise one or more of a plurality of different methods. For example, known "cloned" MIN/ESN combinations can be denied access to the cellular telephone system, although this is easily circumvented by re-programming the fraudulent cellular phone. Another technique would use the MIN/ESN combination to look-up one or more known station class marks of the corresponding cellular phone, compare the known station class marks to the station class mark transmitted to the cell site by the cellular phone, and deny access when a mismatch occurs. Still another technique would compare the dialed phone digits to called numbers, known as fraud dialed digits (FDDs), previously uncovered during the analysis of prior fraudulent cellular phone calls, and deny calls placed to those FDDs. All of these identification and prevention techniques may be performed by the control processor 40 and/or control channel editor 10 and/or the specially programmed switch 46.

An identification technique based on the comparison of RF signatures for the cellular phones could also be used to identify fraudulent cellular phones. The use of RF signature identification is important because it provides a way of independently identifying the fraudulent phone using the ESN or MIN. Moreover, the use of RF signature identification can be used nationally to prevent roaming fraud.

RF Signature Identification

Figure 2:
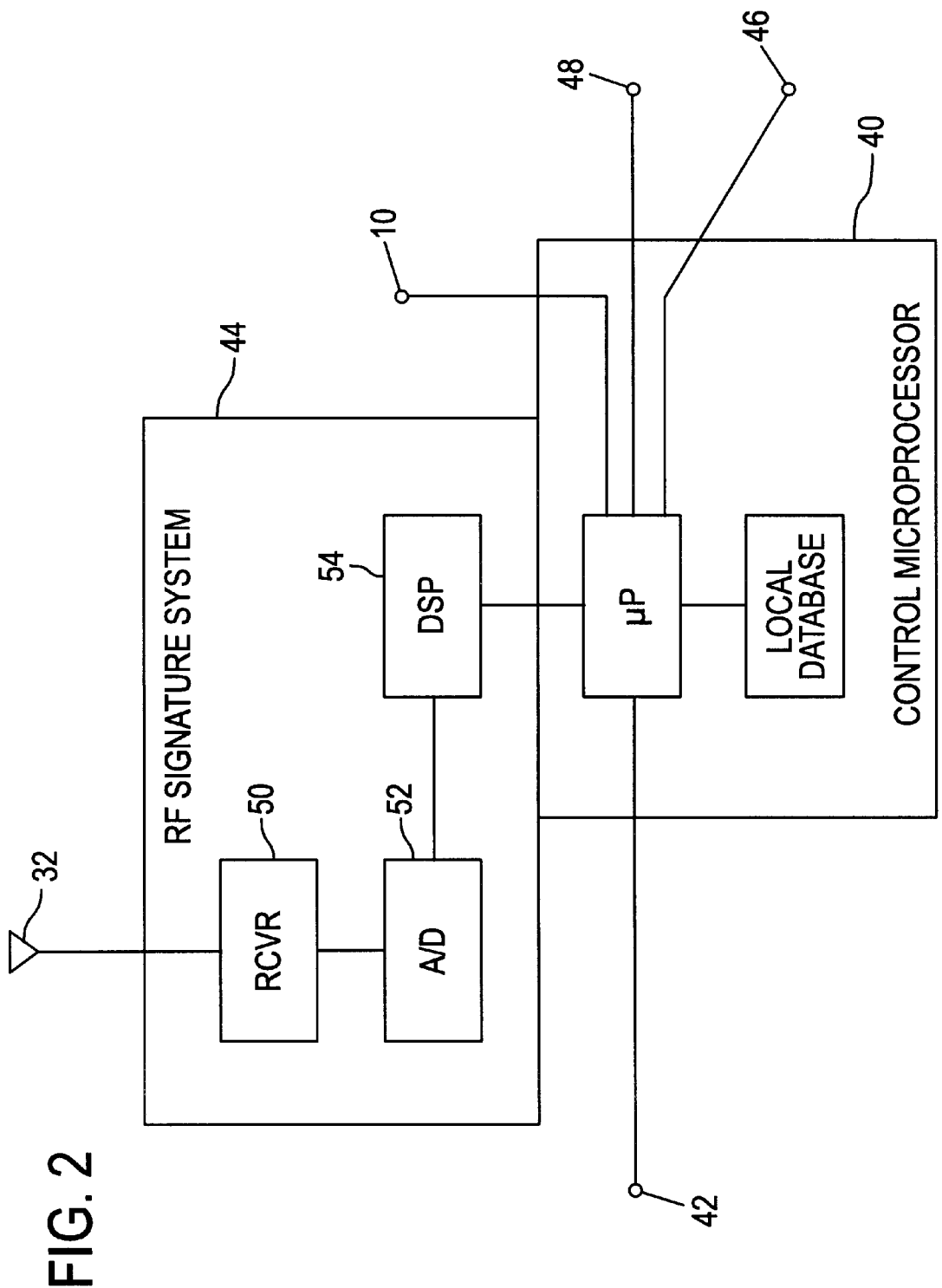
FIG. 2 is a block diagram illustrating the components of the present invention including an emitter detect.

FIG. 2 is a block diagram further illustrating the components of the RF signature system 44. The RF signature system 44 typically comprises an FM receiver 50, analog-to-digital (A/D) converter 52, and a digital signal processor (DSP) 54. From existing antennae 32, the received RF signal is sent to the FM receiver 50 that operates in the 824 MHz to 894 MHz range and has repeatable performance characteristics, including flat frequency and phase response, low phase noise, high dynamic range, stable amplitude, and accurate automatic gain control. The A/D converter 52, which converts the analog output from the FM receiver 50 into digital data, preferably has a minimum sample rate of 3.2 MHz to accommodate a bandwidth greater than or equal to 1.25 MHz. The DSP 54 performs the necessary calculations using the digital output of the A/D converter 52 to determine the RF signature of the cellular phone. The DSP 54 encodes measured characteristics of the cellular phone into a digital RF signature descriptor data stream.

The control microprocessor 40 compares the digital RF signature descriptor data stream to a database of RF signatures of known fraudulent cellular phones (negative validation) or with a database of RF signatures of all non-fraudulent cellular phones (positive validation). In a positive validation database, the combination of RF signature with the associated MIN/ESN combination would most likely prove to be "uncloneable." In a negative validation database, secondary pattern data, such as the cell site, MIN/ESN combination, call history, the called number, call frequency, call time, station, class, etc., can be used to validate a close match.

The technique of identifying an RF signature is not new in the art, and has been previously used in military and intelligence applications. An example of an apparatus for characterizing a radio transmitter can be found in U.S. Pat. No. 5,005,210 issued Apr. 2, 1991, to Ferrell, incorporated by reference herein. Other examples include technology developed by the Electromagnetic Systems Laboratory of TRW, Inc.

The characteristics used in creating the RF signature should be consistent over time, temperature, battery voltage, orientation, location, use of car kits, etc., and yet be distinctive between individual cellular phones. Usually, the RF signature can be any unintentional modulation that is unique to the specific cellular phone. Because of fading due to multipath transmissions, amplitude data will typically be distorted, and thus the characteristics used should preferably comprise phase or frequency type characteristics that are less affected by the cellular environment.

These characteristics can include, but are not limited to, turn-on transmitting amplitude, frequency or phase modulation versus time, the time between turn-on and onset of data, phase and frequency modulation during that delay, the initial amplitude, phase and frequency modulation when data transmission starts, transmission bit times, total times, timing jitter, rise and fall timing, carrier turn-off time, modulation deviation and distortion, modulation phase, bit to bit modulation variations, demodulation spectrum, spurious transmitter data, etc.

Some or all of these various characteristics can be used by the DSP 54 to create an RF signature unique for a given cellular phone. Preferably, the DSP 54 then condenses the selected characteristics into a digital RF signature descriptor data stream having a compact format that is easy to transmit from place to place. For example, the digital RF signature descriptor data stream can be transmitted to a control processor 40 and centralized fraud control system 48 for storage and later inclusion into positive and negative validation databases.

Centralized Fraud Control System

Figure 3:
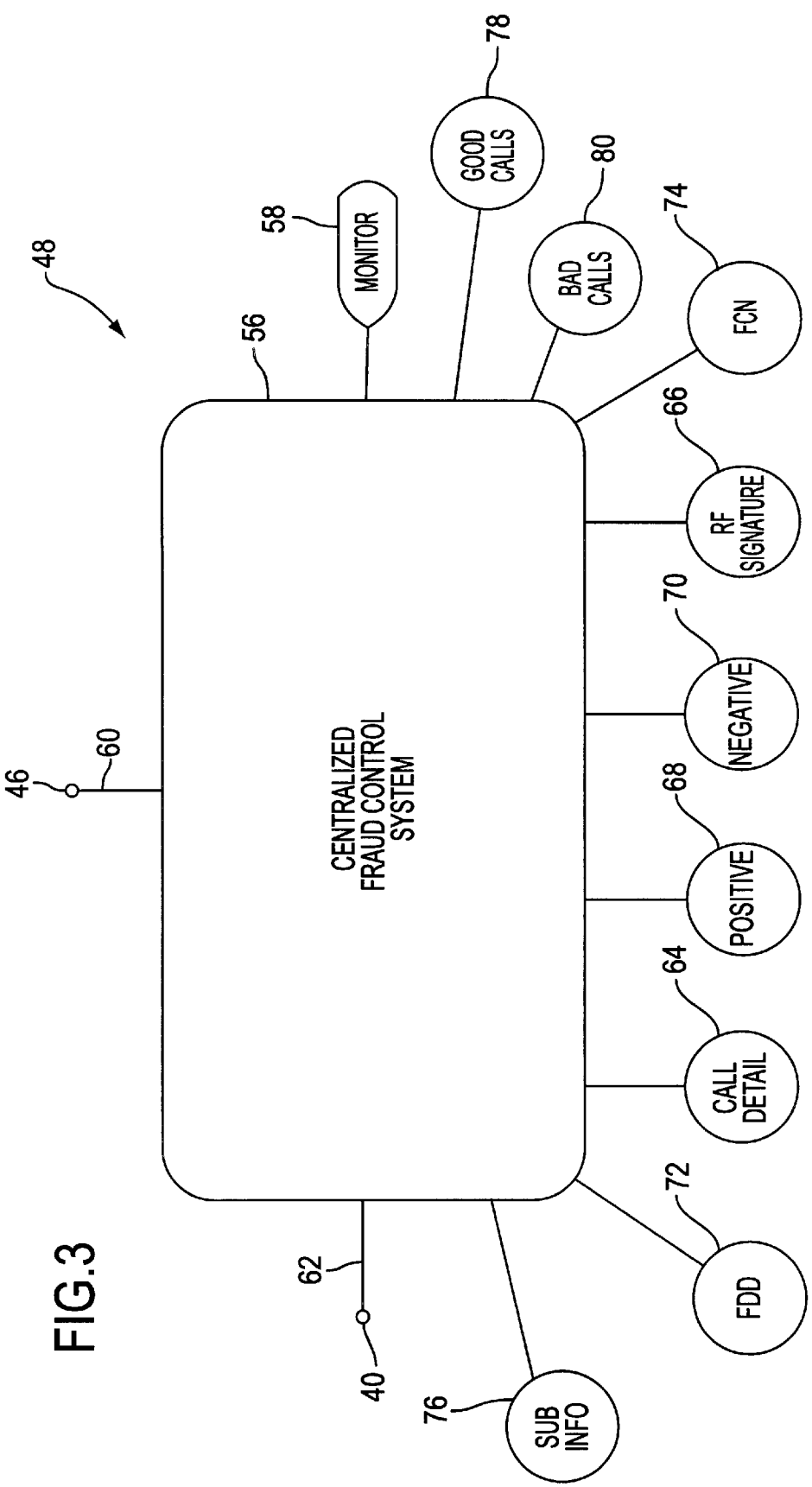
FIG. 3 is a block diagram further illustrating the components of the centralized fraud control system used in the present invention.

FIG. 3 is a block diagram further illustrating the components of the centralized fraud control system 48. The fraud control system comprises a CPU 56, one or more monitors 58, a data link 60 to a port of the switch 46, a data link 62 to the control microprocessor 40, and (optionally) databases for call records 64, RF signatures 66, positive validation 68, negative validation 70, fraud dialed digits (FDDs) 72, frequently called numbers (FCNs) 74, subscriber information 76, good call records 78, and bad call records 80.

The fraud control system 48 performs real-time data collection of call records from the cellular telephone switch 46 into a call record database 64. Using a behavior profiling algorithm, the fraud control system 48 scans the call records in the database 64 and extracts records corresponding to probable fraudulent activity. The behavior profiling algorithm identifies and flags specific activities represented within the different fields of the call records, including time, duration, cell, dialed digits, etc. Relative probabilities are assigned to the specific activities identified and flagged within the call records.

Some example criteria and their relative probabilities are described below:

1. Excessive call duration threshold made by a cellular phone within a given time period. For example, more than one long duration call per hour could result in the assignment of 15 points towards an alarm threshold.
2. Excessive number of call attempts made by a cellular phone within a given time period. For example, more than one call attempt per hour could result in the assignment of 15 points towards an alarm threshold.
3. All domestic toll call attempts made by a cellular phone within a given time period. For example, each domestic toll call attempt per hour could result in the assignment of 13 points towards an alarm threshold.
4. All international toll call attempts made by a cellular phone within a given time period. For example, each international toll call attempt per hour could result in the assignment of 20 points towards an alarm threshold.
5. All three-way conference calls made by a cellular phone within a given time period. For example, each three-way conference call attempt per hour could result in the assignment of 17 points towards an alarm threshold.
6. Excessive number of call attempts to specific NPA/NXXX codes made by a cellular phone within a given time period. For example, more than one call attempt per hour could result in the assignment of 15 points towards an alarm threshold.
7. Any calls with identical MIN/ESN that overlap for more than 59 seconds. 100 points.
8. Any calls to a known phone number previously called by fraudulent cellular phones under the assumption that "who you call is who you are." 100 points.
9. Any calls from a cellular phone to the number of a known fraudulent cellular phone under the assumption (verified by a 70% correlation) that the cellular phone placing the call is fraudulent as well. 100 points.
10. Various combinations of the above activities.

These criteria and associated probabilities are the result of trial and error investigation by the Assignee, and have been validated through experience. Nonetheless, those skilled in the art will recognize that other criteria and probabilities could be substituted for those described above, without departing from the scope of the present invention.

The fraud control system 48 indexes all call records in the call record database 64 associated with a specific MIN/ESN combination and the relative probabilities are accumulated towards an alarm threshold. The alarm threshold reflects an accumulated probability within some defined period, e.g., accumulating 100 probability points within one hour. The alarm threshold may be reached immediately, as when one call overlaps another with an identical MIN for more than 59 seconds.

If the alarm threshold is reached, the MIN/ESN combination is identified as a fraudulent cellular phone. In some cases, these identifications of fraudulent cellular phones are performed automatically by the fraud control system 48. In other cases, these identifications of fraudulent cellular phones are performed automatically by the fraud control system 48, and then verified through the intervention of an operator.

Once a fraudulent cellular phone is identified by the fraud control system 48, the positive and/or negative validation databases 68 and 70 are updated to reflect the identification. The updates may include all manner of phone-specific information, such as the associated RF signature for the phone from the RF signature database 66, the MIN/ESN combination used by the phone, the associated station class marks of the phone, "suspect" numbers dialed by the phone, etc., from the call record database 64 and/or the subscriber information database 76. In addition, the local database used by the control microprocessor 40 is updated to prevent further access by the fraudulent cellular phone.

Call Tagging

Figure 4A:
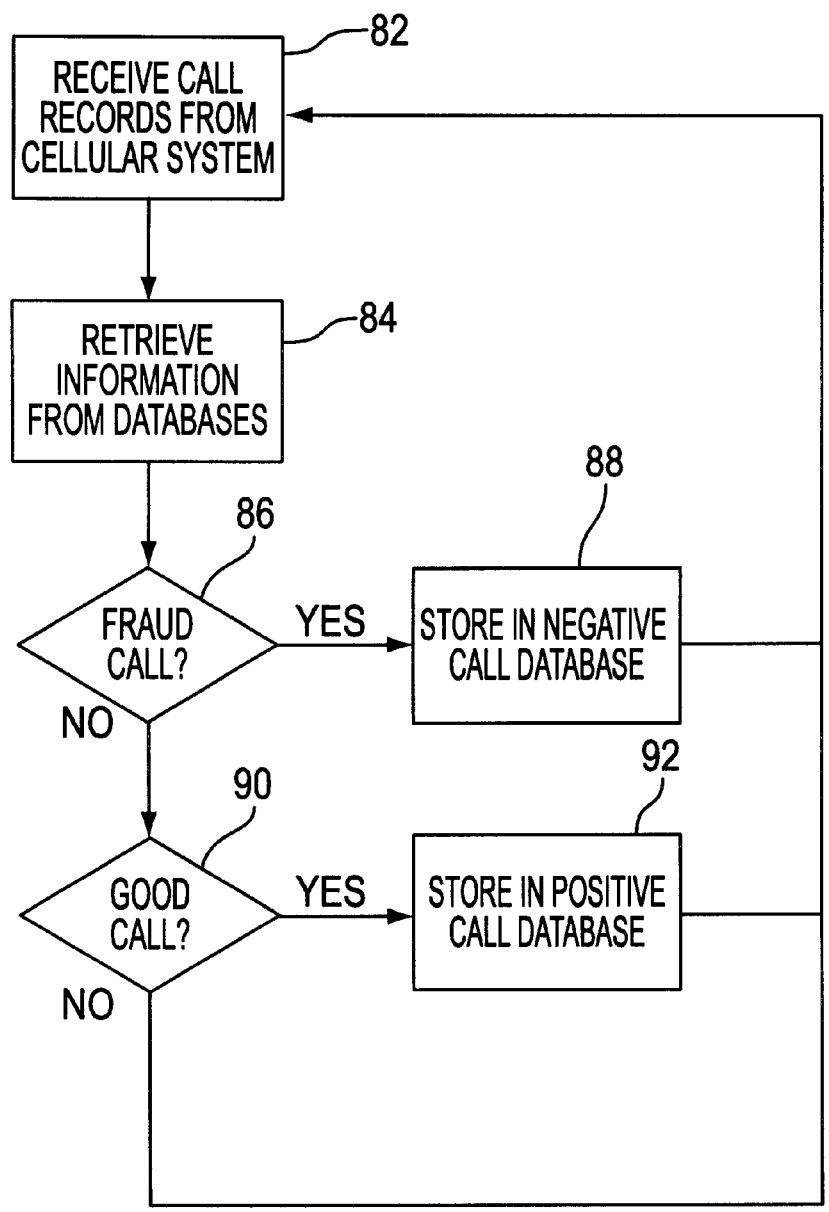
Figure 4B:
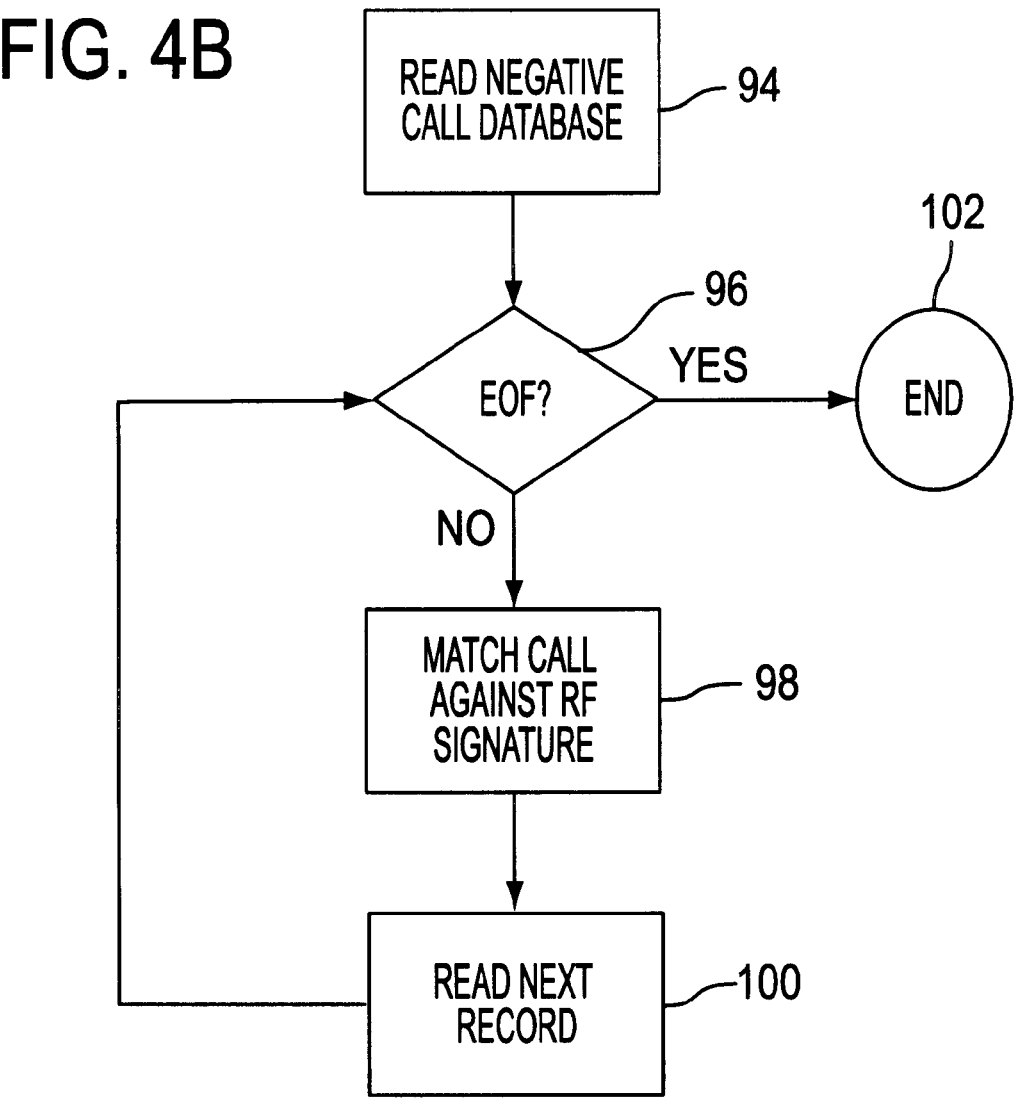

FIGS. 4A, 4B, and 4C are flowcharts illustrating the steps involved in call tagging according to the present invention. By identifying the typical calling pattern of a valid customer or fraudulent phone, the fraud control system 48 identifies specific calls as being known good or bad calls. The fraud control system 48 then uses the identified specific calls to identify the RF signatures of valid customers and fraudulent phones.

Referring first to FIG. 4A, block 82 represents the fraud control system 48 receiving call records from the switch 46 via the data link 60. Block 84 represents the fraud control system 48 retrieving information from the subscriber information database 76, the frequently called numbers database 74, and the fraud dial digits database 72. Block 86 represents the fraud control system 48 determining whether or not the call records are associated with a fraudulent call. If not, control transfers to block 88, which represents the fraud control system 48 storing the call record in a good call database 78; otherwise, control transfers to block 90. Block 90 represents the fraud control system 48 determining whether or not the call records are associated with a good call. If not, control transfers to block 92, which represents the fraud control system 48 storing the call record in a good call database 78; otherwise, control transfers to block 82, which indicates that the call is indeterminate, i.e., neither bad nor good. The function of identifying the call as either good, bad or indeterminate may use any of the techniques described herein, including fraud dialed digits, frequently called numbers, RF signature, as well as secondary pattern data, such as station class mark, call history, call frequency, call time, call duration, cell site, etc.

Referring next to FIG. 4B, block 94 represents the fraud control system 48 reading records from the good call database 78. Block 96 is a decision block that represents the fraud control system 48 determining whether an end of file (EOF) has occurred while reading the good call database 78. If not, control transfers to block 98, which represents the fraud control system 48 matching the record read from the good call database 78 against an RF signature database 66, and block 100, which represents the fraud control system 48 reading the next record from the good call database 78. Upon the occurrence of an EOF, control transfers to block 102, which represents the termination of the logic.

Referring finally to FIG. 4C, block 104 represents the fraud control system 48 reading records from the bad call database 80. Block 106 is a decision block that represents the fraud control system 48 determining whether an end of file (EOF) has occurred while reading the bad call database 80. If not, control transfers to block 108, which represents the fraud control system 48 matching the record read from the bad call database 80 against an RF signature database 66, and block 110, which represents the fraud control system 48 reading the next record from the bad call database 80. Upon the occurrence of an EOF, control transfers to block 112, which represents the termination of the logic.

Fraud Dialed Digits

FIG. 5 is a flowchart illustrating the steps involved in identifying fraud dialed digits (FDD), which comprise phone numbers that are called by fraudulent phones. The fraud dialed digits are then used in the call tagging method described in FIGS. 4A–4C to identify other cellular phones as being fraudulent themselves, based on an observed correlation.

Block 114 represents the fraud control system 48 collecting all call records placed by fraudulent MIN/ESN combinations from the switch 46. Block 116 represents the fraud control system 48 sorting the collected call records by their respective dialed digits. Block 118 is a decision block that represents the fraud control system 48 looping through each set of dialed digits from the collected call records. Block 120 represents the fraud control system 48 finding all MIN/ESN combinations that called the dialed digits. Block 122 represents the fraud control system 48 determining how many fraudulent MIN/ESN combinations called the dialed digits. Block 124 represents the fraud control system 48 determining how many calls were placed to the dialed digits. Block 126 represents the fraud control system 48 determining how many minutes of fraudulent calls were placed to the dialed digits. Block 128 represents the fraud control system 48 computing a score for the dialed digits, based on the number of fraudulent MIN/ESN combinations that placed calls to the dialed digits, the average score of each of these fraudulent MIN/ESN combinations, the number of calls placed by the fraudulent MIN/ESN combinations, the duration of the calls placed by the fraudulent MIN/ESN combinations, the number of non-fraudulent MIN/ESN combinations that placed calls to the dialed digits, the average score of each of these non-fraudulent MIN/ESN combinations, the number of calls placed by the non-fraudulent MIN/ESN combinations, and the duration of the calls placed by the non-fraudulent MIN/ESN combinations. In block 128, the fraud control system 48 increases the score for the dialed digits based on the number of fraudulent MIN/ESN combinations that called the dialed digits and decreases the score for the dialed digits based on the number of non-fraudulent MIN/ESN combinations that called the dialed digits. Block 132 is a decision block that represents the fraud control system 48 repeating blocks 118–130 until all of the dialed digits have been processed. Block 134 represents the fraud control system 48 updating the history associated with each set of dialed digits using the new computed score. Block 136 represents the fraud control system 48 re-computing a historic running average for each set of dialed digits using the new score and previous scores. Block 136 also represents the fraud control system 48 comparing the new total score to an alarm threshold, and if the alarm threshold is reached, then the dialed digits are identified and stored as FDDs. These FDDs can then be used in the call tagging method of FIGS. 4A–4C.

Frequently Called Numbers

Figure 6:
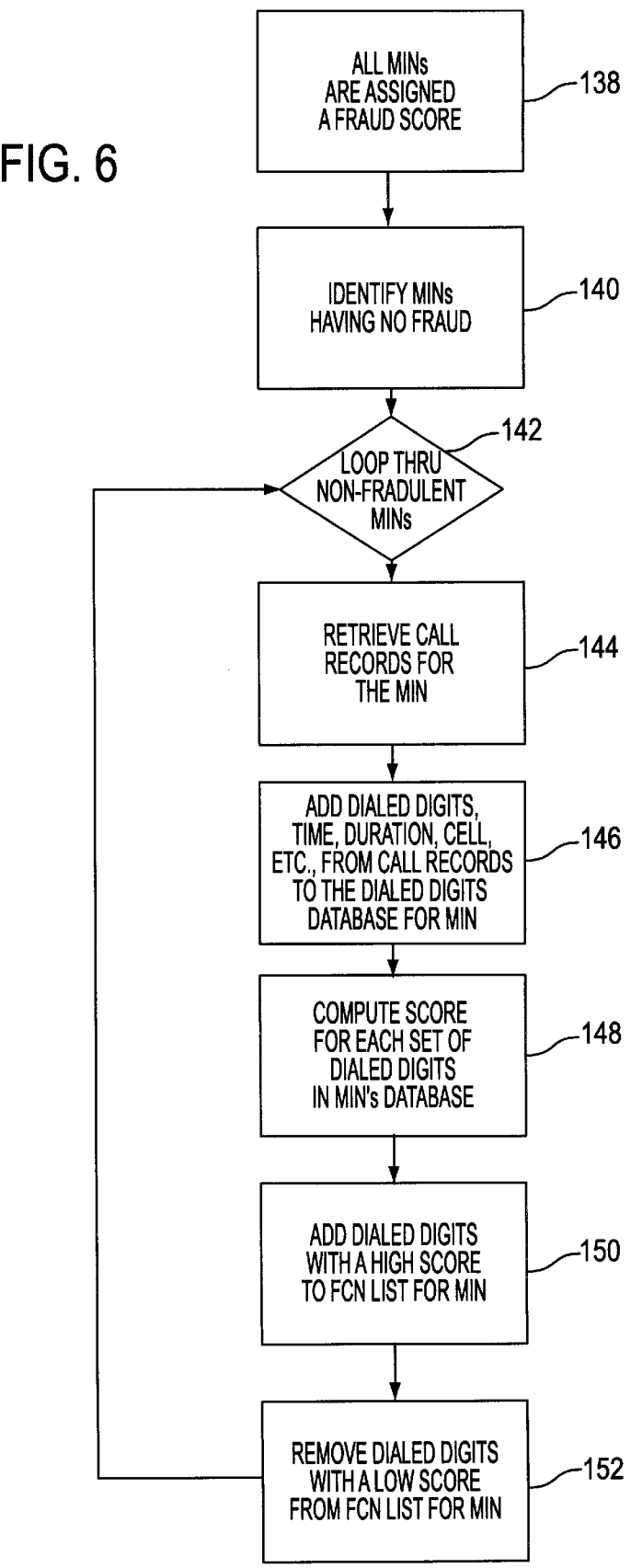
FIG. 6 is a flowchart illustrating the steps involved in identifying frequently called numbers (FCNs), which are numbers that are called by valid customers.

FIG. 6 is a flowchart illustrating the steps involved in identifying frequently called numbers (FCNs), which are numbers that are called by valid customers. By identifying the typical calling pattern of a valid customer, the fraud control system 48 identifies specific calls as being known good calls, even after fraudulent activity has occurred on a MIN/ESN combination. The FCNs are then used in the call tagging method described in FIGS. 4A–4C.

Block 138 represents the fraud control system 48 assigning a fraud score to each MIN/ESN combination. Block 140 represents the fraud control system 48 identifying those MIN/ESN combinations that have had no apparent fraudulent activity. Block 142 is a decision block that represents the fraud control system 48 looping through each of the identified non-fraudulent MIN/ESN combinations (generally once a day). Block 144 represents the fraud control system 48 retrieving all call records associated with the MIN/ESN combination. Block 146 represents the fraud control system 48 adding records to a dialed digits database for the MIN/ESN combination using the retrieved call records, wherein the records comprise the dialed digits for each call, as well as the associated time of the call, duration of the call, cell location(s) for the call, etc. Block 148 represents the fraud control system 48 computing a score for each set of dialed digits in the dialed digits database for the MIN/ESN combination, wherein the score is based on the number of days the dialed digits were called, the number of calls made to the dialed digits, the duration of the calls to the dialed digits, the cell location(s) for the calls to the dialed digits, and other information. Block 150 represents the fraud control system 48 adding those sets of dialed digits having a relatively high computed score to a Frequently Called Number (FCN) list for the MIN/ESN combination. Block 152 represents the fraud control system 48 removing those sets of dialed digits having a relatively low computed score from the Frequently Called Number (FCN) list for the MIN/ESN combination. Block 152 also represents the fraud control system 48 repeating blocks 142–152 until all of the non-fraudulent MIN/ESN combinations have been processed. These FCN lists, and their associated information, can then be used in the call tagging method of FIGS. 4A–4C, as well as real-time call termination methods.

Conclusion

This concludes the description of the preferred embodiment of the invention. The following paragraphs describe some alternative methods of accomplishing the same invention.

In addition to cellular telephone systems, those skilled in the art will recognize that the present invention can be applied to other mobile radios, personal communications systems, paging systems, aircraft communications, satellite communications, as well any other controlled-access radio frequency communications systems.

Rather than using the specific components and combinations of components described herein, those skilled in the art will recognize that other components and combinations of components could be substituted therefor without departing from the scope of the present invention. Moreover, the connections between various components may be modified from those illustrated herein.

Rather than using the specific methods and process steps described herein, those skilled in the art will recognize that other methods and steps could be substituted therefor without departing from the scope of the present invention.

In summary, a method and apparatus for fraud control in cellular telephone systems has been described. The invention identifies relative fraud probabilities for call records from the cellular telephone system, associates the call records with radio frequency (RF) signatures, and identifies the radio frequency signatures as being fraudulent or valid based on the relative fraud probabilities for the associated call records.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of identifying valid or fraudulent RF signatures of phones in a cellular telephone system, comprising the steps of:
   (a) identifying relative valid or fraud probabilities using call records from the cellular telephone system;
   (b) associating the calls with corresponding-radio frequency (RF) signatures; and
   (c) identifying the radio frequency signatures as being fraudulent or valid based on the relative fraud probabilities for the associated calls.

2. The method as set forth in claim 1 above, wherein the associating step comprises the step of matching the call records with the radio frequency signatures based on one or more characteristics of both the call records and the radio frequency signature, wherein the characteristics are selected from a group comprised of: time of day, day of week, cell site originating location, and dialed digits for an associated call.

3. The method as set forth in claim 2, further comprising the steps of receiving a call transmitted from a cellular telephone, generating a radio frequency signature for the cellular telephone, comparing the generated radio frequency signature to radio frequency signatures identified as fraudulent or valid, and preventing the call from completing when the comparison indicates the generated radio frequency signature is fraudulent.

4. The method as set forth in claim 3, wherein the associating step comprises the step of matching the call records with the radio frequency signatures based on one or more characteristics of both the call records and the radio frequency signature, and wherein the characteristics are selected from a group comprised of: time of day, day of week, cell site originating location, and dialed digits for an associated call.

5. The method as set forth in claim 3, wherein the identifying step comprises the step of assigning a high fraud probability to call records containing a called number identical to known fraud dialed digits.

6. The method as set forth in claim 3, wherein the identifying step comprises the step of assigning a low fraud probability to call records containing a called number identical to known frequently called numbers for valid subscribers.

7. The method as set forth in claim 1 above, wherein the identifying step comprises the step of assigning a high fraud probability to call records containing a called number identical to known fraud dialed digits.

8. The method as set forth in claim 1 above, wherein the identifying step comprises the step of assigning a low fraud probability to call records containing a called number identical to known frequently called numbers for valid subscribers.

9. The method as set forth in claim 1 above, further comprising the steps of receiving a call transmitted from a cellular telephone, generating a radio frequency signature for the cellular telephone, comparing the generated radio frequency signature to the radio frequency signatures identified as fraudulent or valid, and preventing the call from completing when the comparison indicates the generated radio frequency signature is fraudulent.

10. The method as set forth in claim 9, wherein the associating step comprises the step of matching the call records with the radio frequency signatures based on one or more characteristics of both the call records and the radio frequency signature, and wherein the characteristics are selected from a group comprised of: time of day, day of week, cell site originating location, and dialed digits for an associated call.

11. The method as set forth in claim 9, wherein the identifying step comprises the step of assigning a high fraud probability to call records containing a called number identical to known fraud dialed digits.

12. The method as set forth in claim 9, wherein the identifying step comprises the step of assigning a low fraud probability to call records containing a called number identical to known frequently called numbers for valid subscribers.

13. The method as set out in claim 1, wherein the step of identifying the fraud probability includes identifying a call to either including fraud dialed digits, or a frequently called number.

14. The method as claimed in claim 1, wherein the identifying step includes computing a score for dialed digits based on a number of fraudulent MIN/ESN combinations of calls placed to the dialed digits, the average score of each of these fraudulent MIN/ESN combinations, the number of calls placed by the fraudulent MIN/ESN combinations, the duration of calls placed by the fraudulent MIN/ESN combinations, the number of non-fraudulent MIN/ESN combinations of calls to the dialed digits, the average score of each of the non-fraudulent MIN/ESN combinations, the number of calls placed by the non-fraudulent MIN/ESN combinations, and the duration of calls placed by the non-fraudulent MIN/ESN combinations.

15. The method as claimed in claim 1, wherein the fraud identifying step includes computing a score for each set of dialed digits in a dialed digits database for a MIN/ESN combination, wherein the score is based on the number of days dialed digits are called, the number of calls made to the dialed digits, the duration of calls to the dialed digits, and the call locations for the calls to the dialed digits.

16. The method as claimed in claim 1 wherein the identification of the radio frequency signatures is effected at substantially the same time that a telephone call is made.

17. The method as claimed in claim 1 wherein the identification of the radio frequency signatures is effected at a time after a telephone call is made.

18. An apparatus for identifying valid or fraudulent phones in a cellular telephone system, comprising:
- a computer system coupled to a switch in the cellular telephone system, the computer system including means for:
  - (1) identifying relative valid or fraud probabilities using call records received from the switch in the cellular telephone system;
  - (2) associating the call with corresponding radio frequency (RF) signatures; and
  - (3) identifying the radio frequency signatures as being fraudulent or valid based on the relative fraud probabilities for the associated calls.

19. The apparatus as set forth in claim 18 above, wherein the means for associating comprises means for matching the call records with the radio frequency signatures based on one or more characteristics of both the call records and the radio frequency signature, wherein the characteristics are selected from a group comprised of: time of day, day of week, cell site originating location, and dialed digits for an associated call.

20. The apparatus as set forth in claim 18 above, wherein the means for identifying comprises means for assigning a high fraud probability to call records containing a called number identical to known fraud dialed digits.

21. The apparatus as set forth in claim 18 above, wherein the means for identifying comprises means for assigning a low fraud probability to call records containing a called number identical to known frequently called numbers for valid subscribers.

22. The apparatus as set forth in claim 18 above, further comprising a radio frequency signature system, coupled to the cellular telephone system and the computer system, for receiving a call transmitted from a cellular telephone, for generating a radio frequency signature for the cellular telephone, for comparing the generated radio frequency signature to the radio frequency signatures identified as fraudulent or valid, and for preventing the call from completing when the comparison indicates the generated radio frequency signature is fraudulent.

* * * * *